UNITED STATES PATENT OFFICE.

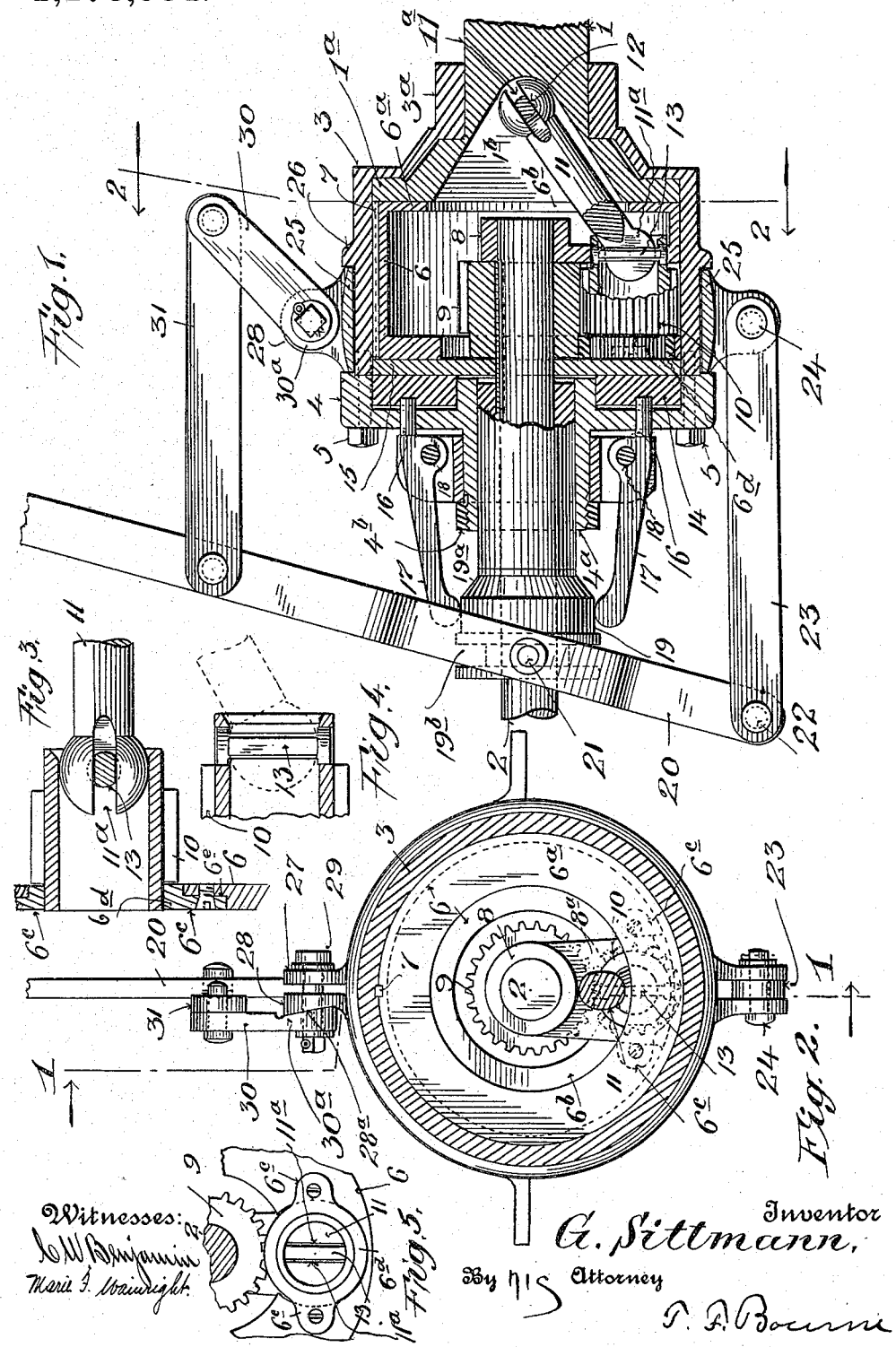

GUSTAV SITTMANN, OF NEW YORK, N. Y.

TRANSMISSION-GEARING.

1,176,864.  Specification of Letters Patent.  Patented Mar. 28, 1916.

Application filed February 20, 1915. Serial No. 9,480.

*To all whom it may concern:*

Be it known that I, GUSTAV SITTMANN, a citizen of the United States, and resident of New York city, borough of Brooklyn, in the county of Kings and State of New York, have invented certain new and useful Improvements in Transmission-Gearing, of which the following is a specification.

The object of my invention is to provide simple, compact and efficient transmission gearing adapted to rotate a driven member or shaft either forwardly or reversely as required.

My invention comprises novel details of improvement and combinations of parts that will be more fully hereinafter set forth and then pointed out in the claims.

Reference is to be had to the accompanying drawings forming part hereof, wherein, Figure 1 is a substantially central section of my improved transmission gearing, taken substantially on the line 1, 1, in Fig. 2; Fig. 2 is a cross section substantially on the line 2, 2, in Fig. 1; Fig. 3 is an enlarged sectional detail, Fig. 4 is a similar view at right angles to Fig. 3, and Fig. 5 is a detail hereinafter referred to.

Similar numerals of reference indicate corresponding parts in the several views.

In the accompanying drawings the numeral 1 indicates a rotative member, which may be a suitably supported shaft to be driven by a motor, and 2 indicates a second member in axial alinement with member 1. Member 2 may be a suitably supported shaft utilized as a driven member.

At 3 is a suitable housing or casing supported concentrically with respect to members 1 and 2. The housing 3 is shown provided with a hub $3^a$ journaled upon member 1 and having a cap or disk 4 shown mounted concentrically with respect to member 2. Cap 4 is shown removably secured to housing 3 by screws or bolts 5, whereby the parts 3 and 4 rotate together. Within housing 3 is a suitable concentrically disposed shell or frame 6, shown having an internal flange $6^a$ adapted to coact frictionally with the end or flange portion $1^a$ of member 1 within the housing. The shell or frame 6 is adapted to have longitudinal movement relatively to housing 3, and to rotate therewith by means of a key 7 disposed between said parts. Shell or frame 6 is disposed concentrically with respect to member 2 which is shown projecting within said shell, and said shell is provided with a bearing 8 for said shaft. A gear 9 secured upon member or shaft 2 meshes with a gear or pinion 10 suitably journaled upon shell 6, eccentric to members 1 and 2. I have shown said pinion provided with gudgeons at its ends, one of which gudgeons is journaled in the upright $8^a$ of bearing 8 and the other of which gudgeons is journaled in a bearing or collar $6^d$, shown fitted in an opening in a wall of shell 6 and having ears $6^c$ secured by screws in recesses $6^e$ in said wall (Figs. 3 and 5). After gear or pinion 10 has been fitted in shell 6 bearing or collar $6^d$ may be secured in place.

A drive rod or link 11 is pivotally connected with member or shaft 1 and with gear 10, for which purpose I have shown a pin 12 pivotally connecting member or shaft 1 with rod or link 11 and a pin 13 pivotally connecting rod or link 11 with gear or pinion 10. I prefer to journal said pins in suitable apertures in member 1 and in gear or pinion 10, as illustrated in Figs. 3 and 4, and to slot the ends of said rod or link 11 as illustrated at $11^a$ to receive and have appropriate movement or play with respect to said pins. Said pins are also preferably flattened on opposite sides to receive the corresponding forked or slotted end of rod or link 11, whereby said pins may rotate in their bearings, thereby reducing friction and permitting proper relative movement of the parts. In order to reduce the dimensions of the gearing, I have shown member or shaft 1 as recessed at $1^b$ to receive rod or link 11, which rod or link passes through the opening $6^b$ in shell 6 within the flange $6^a$ thereof, opposing the recess $1^b$. Means are provided to lock shell 6 to housing 3 for high speed or direct rotation of members 1 and 2 together, for which purpose I have shown a friction disk or plate 14 loosely located between cap 4 and shell 6, and to provide for friction and wear between such parts one or more friction disks or plates 15 may be interposed between disk 14 and shell 6. Means are provided for forcing disk or plate 14 toward shell 6, to push the latter toward member 1 or its flange $1^a$. For this purpose I have shown pins 16 slidably supported by cap 4 and adapted to be operated by levers or arms 17, pivotally supported on collar 18, said parts acting in the nature of a friction clutch.

At 19 is a clutch member, shown in the form of a sleeve having a beveled or cone-like portion 19ª to coact with the levers or arms 17, and adapted to slide freely upon member or shaft 2 and within the hub 4ª of cap 4, said sleeve, in the example illustrated, serving as a bearing or bushing for said cap.

Any suitable means may be provided for shifting the clutch member 19, for which purpose I have shown a lever 20 having one or more pins 21 entering the annular groove 19ᵇ of the clutch member 19, which lever is shown pivotally connected at 22 to a link 23 pivotally supported at 24 upon the housing. When lever 20 is moved to the right, as shown in Fig. 1, the cone member 19ª will separate or expand the levers 17, causing the pins 16 to push disk or plate 14 to frictionally unite shell 6 with member or shaft 1 by pressure of the parts 6ª and 1ª together, whereby the gearing will rotate as a unit on direct drive, whereby the driving and driven members will be rotated at the same speed. It will be understood that there is sufficient freedom for play between the frictional surfaces of the parts 1ª, 3ª, 6, 15 and 14 to permit said parts to rotate freely when not pressed together by the action of levers 17. When the driven member is to be reversed the clutch devices are released by shifting the clutch member 19 to the left in Fig. 1, to release levers 17 from pins 16, and thereupon the housing 3 is to be retained from rotation. To this end I have shown a strap or band 25 encircling housing 3, being shown retained in position thereon by projection 26 on said housing, which may be in the form of an annular flange, and by the adjacent projecting edge of cap 4. Band 25 is divided so that its ends may be drawn together to grasp housing 3 in any suitable manner. In the example illustrated the ends of the band are respectively provided with ears or lugs 27, 28 receiving pin or bolt 29 on which is journaled an arm 30 that is pivotally connected by link 31 with lever 20. As shown in Fig. 2, ear 28 and arm 30 are shown having opposing coacting cam-like faces 28ª, 30ª, respectively, so arranged that when the parts are in the position shown in Fig. 1 band 25 will expand to permit free rotation of housing 3. When lever 20 is moved sufficiently far to the left in Fig. 1 to release shell 6 from frictional coaction with member 1, the link 31 will swing arm 30 sufficiently far to cause the cam-like faces 30ª, 28ª to tighten band 25 upon housing 3 to retain the latter from rotation, whereupon continued rotation of member or shaft 1 will cause rod or link 11 to rotate on its longitudinal axis, which in turn will rotate gear or pinion 10, (since shell 6 is now retained from rotation by reason of key 7 between said shell and housing 3), whereby gear 9 will be rotated, and member 2 will rotate in a direction reverse to member 1. When lever 20 is adjusted to an intermediate position all the parts are free for idling. According to the ratio of the gears 9, 10 the speed of reverse rotation of member 2 from member 1 may be such as desired. Furthermore, it will be understood that member 2 may be the driving member, and member 1 may be the driven member, in which event the rotation of gear 10 by gear 9 will cause rotation of rod or link 11 to rotate member 1 in a reverse direction to the rotation of member 2. In such case, when the parts are in the position shown in Fig. 1, member 1 will be driven in the same direction by and at the same speed as member 2.

My improved transmission gearing is adapted for use on motor boats and in analogous relations, where the member 1 may be a shaft driven by the motor and the member 2 may be, or may drive, the propeller shaft, a simple operation of lever 20 in one direction thereby serving to connect the motor to the propeller for direct drive, and a simple reverse movement of lever 20 serving to release members 1 and 2 from direct drive and cause member 2 to be driven reversely to member 1 and at a slower speed. The transmission gearing is light and simple in construction, hence may be readily supported between the opposing ends of members or shafts 1, 2.

Changes may be made in the details of construction and arrangements of parts shown and described, as the same may be varied, within the scope of the appended claims, without departing from the spirit of the invention.

Having now described my invention what I claim is:—

1. A transmission gearing comprising driving and driven members, a housing, a shell movable within and connected to rotate with the housing, a gear carried by said shell, a gear connected with one of said members and coactive with the first named gear, a rod operatively connecting the first named gear with one of said members, means to cause said shell to connect said members to rotate together in the same direction, and means to limit rotation of some of said parts.

2. A transmission gearing comprising driving and driven members, a housing, a shell within and connected to rotate with the housing, a gear carried by said shell, a gear connected with one of said members and coactive with the first named gear, a rod operatively connecting the first named gear with one of said members, means for frictionally connecting said shell with one of said members, and means to limit rotation of some of said parts.

3. A transmission gearing comprising driving and driven members, a housing, a shell within and connected to rotate with the housing, a gear carried by said shell, a gear connected with one of said members and coactive with the first named gear, a rod operatively connecting the first named gear with one of said members, said shell opposing the driving member, friction means interposed between the housing and the shell, and means to operate said friction means to operatively connect the housing and shell.

4. A transmission gearing comprising axially disposed members, a housing concentrically disposed with respect to said members, a shell slidable within the housing and connected to rotate therewith, said shell and one of said members opposing each other for operative engagement, a gear carried by said shell eccentric to said members, a rod operatively connecting said gear with one of said members, a gear upon the other of said members to coact with the first named gear, means to retain said housing from rotation, and means to operatively unite the housing and shell with one of said members.

5. A transmission gearing comprising axially disposed members, a housing concentrically disposed with respect to said members, a shell slidable within the housing and connected to rotate therewith, said shell and one of said members opposing each other for operative engagement, a gear carried by said shell eccentric to said members, a rod operatively connecting said gear with one of said members, a gear upon the other of said members to coact with the first named gear, a friction member to retain the housing from rotation, devices to unite the housing and shell with one of said members for rotation together, and means to operate said friction member and said devices successively to release the housing while connecting the housing, shell and member together, and vice versa.

6. A transmission gearing comprising axially disposed members, a housing concentrically disposed with respect to said members, a shell slidable within the housing and connected to rotate therewith, said shell and one of said members opposing each other for operative engagement, a gear carried by said shell eccentric to said members, a rod operatively connecting said gear with one of said members, a gear upon the other of said members to coact with the first named gear, a band to retain the housing from rotation, levers connected with the housing, means between the levers and shell to frictionally unite the latter to one of said members, a cone-like member upon the other of said first named members to operate said levers, a lever to operate said cone-like member, and devices operated by said lever to cause said band to grasp and release said housing.

7. A transmission gearing comprising driving and driven members, a gear connected with one of said members, a gear in mesh with the first named gear, means to rotatively support the second named gear, a rod operatively connecting the second named gear with the other of said members, means to limit rotation of the second named gear around the first named gear, and friction means to unite said members for driving one directly by the other separately from and without utilizing said gears and rod.

Signed at New York city, in the county of New York and State of New York this 18th day of February, A. D. 1915.

GUSTAV SITTMANN.

Witnesses:
MARIE F. WAINRIGHT,
T. F. BOURNE.

Copies of this patent may be obtained for five cents each, by addressing the "Commissioner of Patents, Washington, D. C."